United States Patent [19]

Danson

[11] Patent Number: 4,764,090
[45] Date of Patent: Aug. 16, 1988

[54] VERTICAL WIND TURBINE

[75] Inventor: David P. Danson, Phoenix, Ariz.

[73] Assignee: Wind Feather, United Science ASC, Phoenix, Ariz.

[21] Appl. No.: 569,567

[22] Filed: Jan. 9, 1984

[51] Int. Cl.$^4$ .............................................. F03D 7/06
[52] U.S. Cl. ...................................... 416/17; 416/119; 416/236 A
[58] Field of Search ................... 416/197 A, 117–119, 416/17, 9, 41 R, 236 A, 112 A, 116, 108–111; 73/188, 189

[56] References Cited

U.S. PATENT DOCUMENTS

| 566,747 | 9/1896 | Engberg | 416/41 R |
|---|---|---|---|
| 662,944 | 12/1900 | Jones | 416/41 R |
| 764,759 | 7/1904 | Owen | 73/189 |
| 1,419,000 | 6/1922 | Wilson | 416/41 R |
| 1,465,593 | 8/1923 | Barrett et al. | 416/109 |
| 1,741,248 | 12/1929 | Nitardy | 416/17 |
| 1,968,838 | 8/1934 | Lanagan | 73/189 |
| 2,266,172 | 12/1941 | Davis | 73/188 X |
| 2,457,514 | 12/1948 | Wood | 416/41 R |
| 2,603,300 | 7/1952 | King | 416/119 X |
| 2,749,751 | 6/1956 | Hastings | 73/189 |
| 3,371,529 | 3/1968 | Tillman | 73/188 |
| 4,125,343 | 11/1948 | Olson | 416/41 R |
| 4,203,707 | 5/1980 | Stepp | 416/41 R |
| 4,260,328 | 4/1981 | Hamel | 416/109 X |
| 4,278,894 | 7/1981 | Ciman | 416/108 X |
| 4,488,431 | 12/1984 | Miga | 73/189 |
| 4,494,007 | 1/1985 | Gaston | 416/111 X |

FOREIGN PATENT DOCUMENTS

| 0008590 | 3/1980 | European Pat. Off. | 416/17 |
|---|---|---|---|
| 49264 | of 0000 | Fed. Rep. of Germany | 416/17 |
| 3108945 | 10/1982 | Fed. Rep. of Germany | 416/17 |
| 773033 | 11/1934 | France | 416/197 A |
| 910191 | 5/1946 | France | 416/236 A |
| 1104137 | 11/1955 | France | 416/119 |
| 27078 | 3/1981 | Japan | 416/108 |
| 2017230 | 11/1979 | United Kingdom | 416/17 |

Primary Examiner—Everette A. Powell, Jr.

[57] ABSTRACT

A cross wind axis type wind turbine includes four wind driven airfoil blades pivotally connected between upper and lower sets of support spokes supported on a rotating vertical column so that the blades are upwardly inclined towards the column axis to produce an accelerated downwardly swirling air flow in the turbine interior. The lower spokes are airfoil shaped to draw wind into the turbine to further accelerate the air flow in the turbine for improved blade efficiency. A feedback control arrangement responsive to changes in wind speed or direction adjusts the blade angles to the wind for optimum efficiency by virtue of a rack and pinion assembly connecting each blade to a center plate through connecting rods extending radially through each upper spoke. The center plate is mounted within the column on a control shaft that includes an offset portion that pivots during blade rotation about the column, or when rotated by a wind vane, to vary the radial positions of the plate and thereby the blades through the rack connections. Alternatively, a pair of weights radially movable within the lower spokes by centrific force in response to variations in wind velocity can be connected to pivot the control shaft to adjust the blade angles. Each blade includes a series of troughs formed equispaced to each other along the blade length that are respectively tapered towards the leading edge to cause wind entering the troughs to diverge and decelerate for maximum wind energy transfer to the blades.

14 Claims, 5 Drawing Sheets

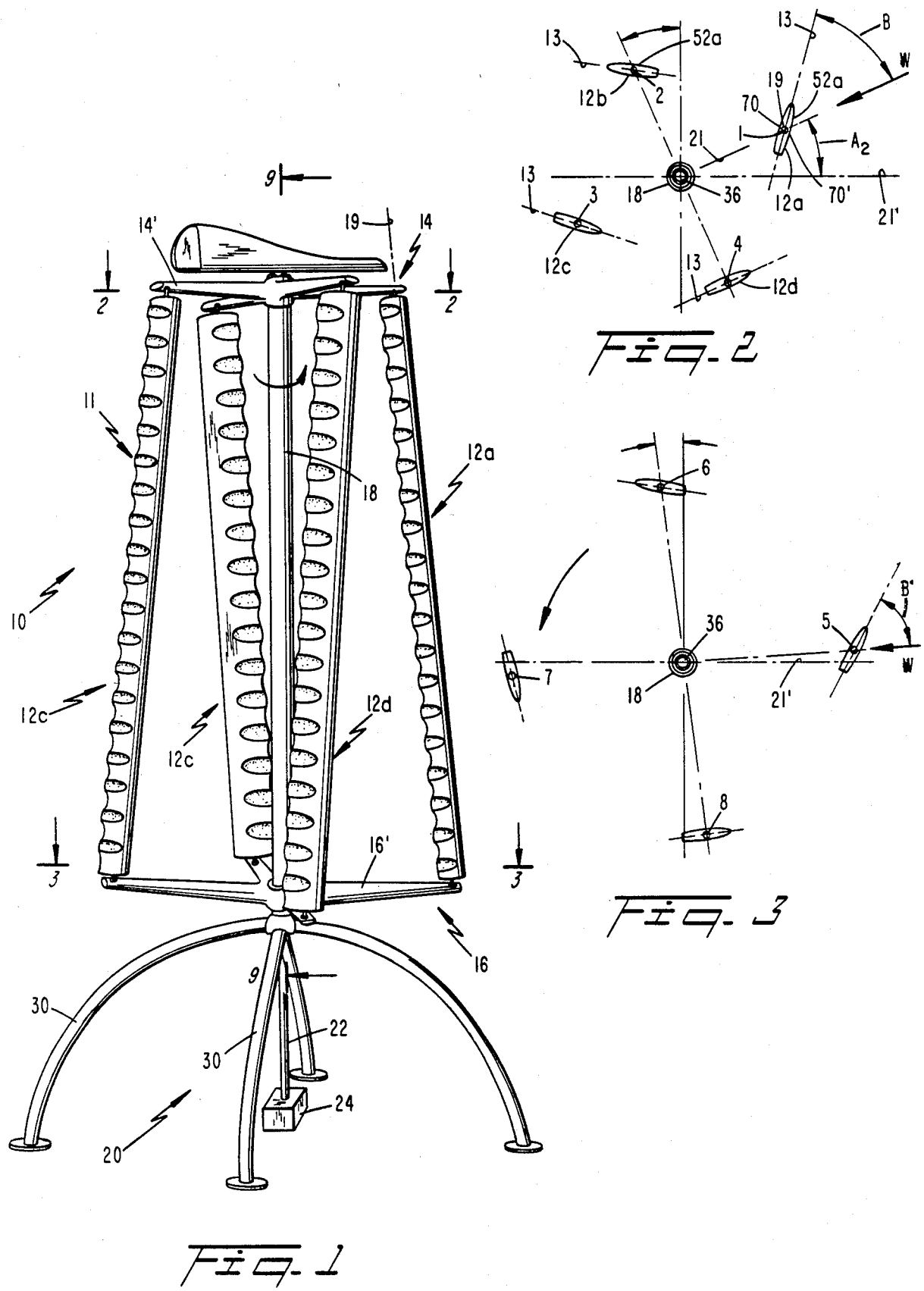

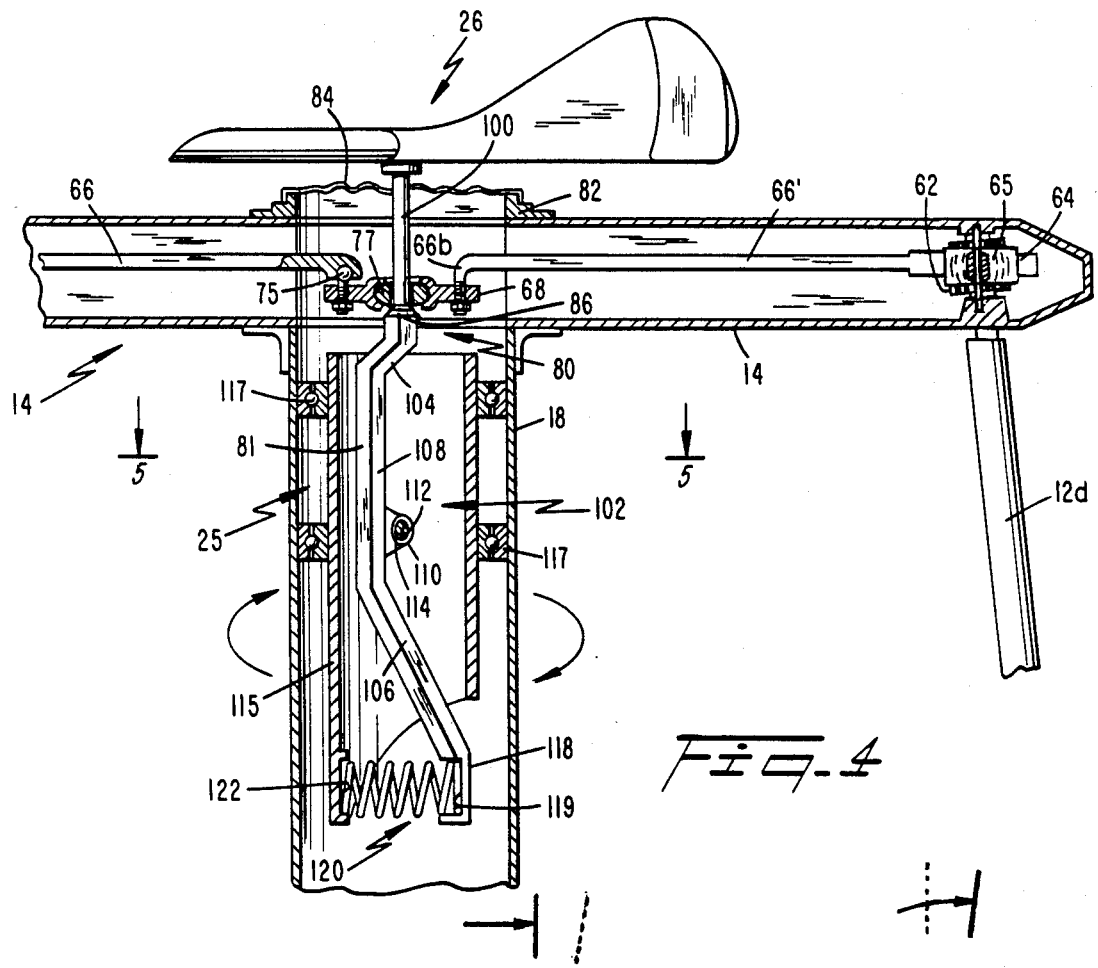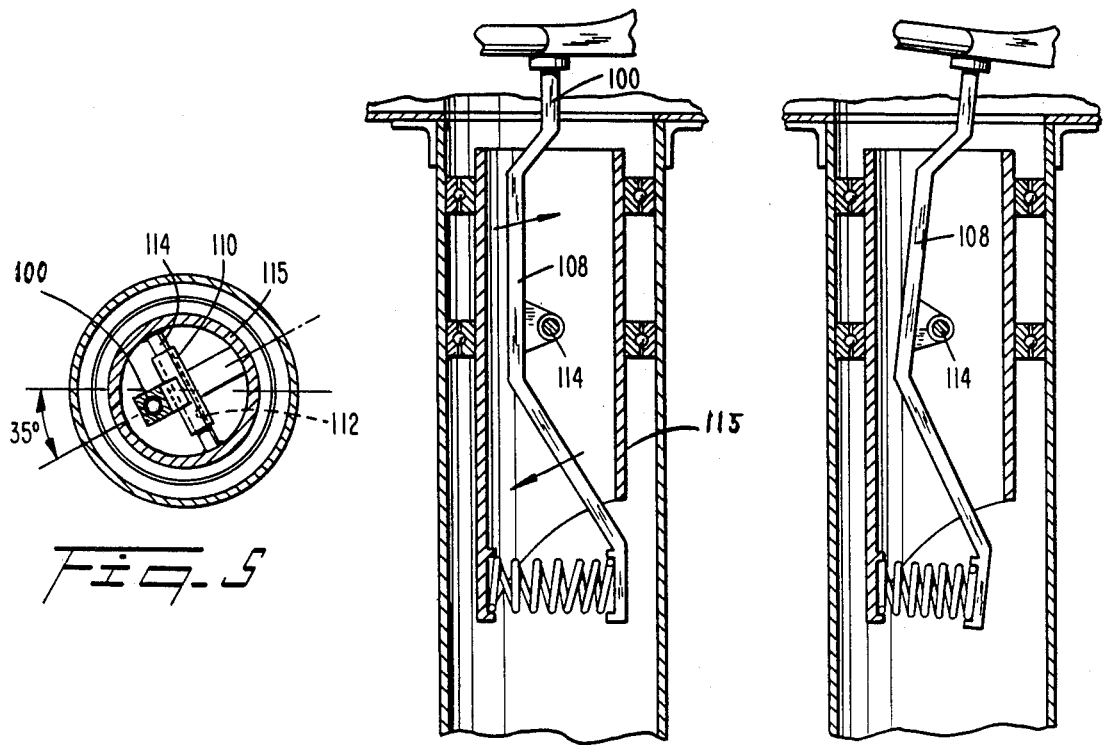

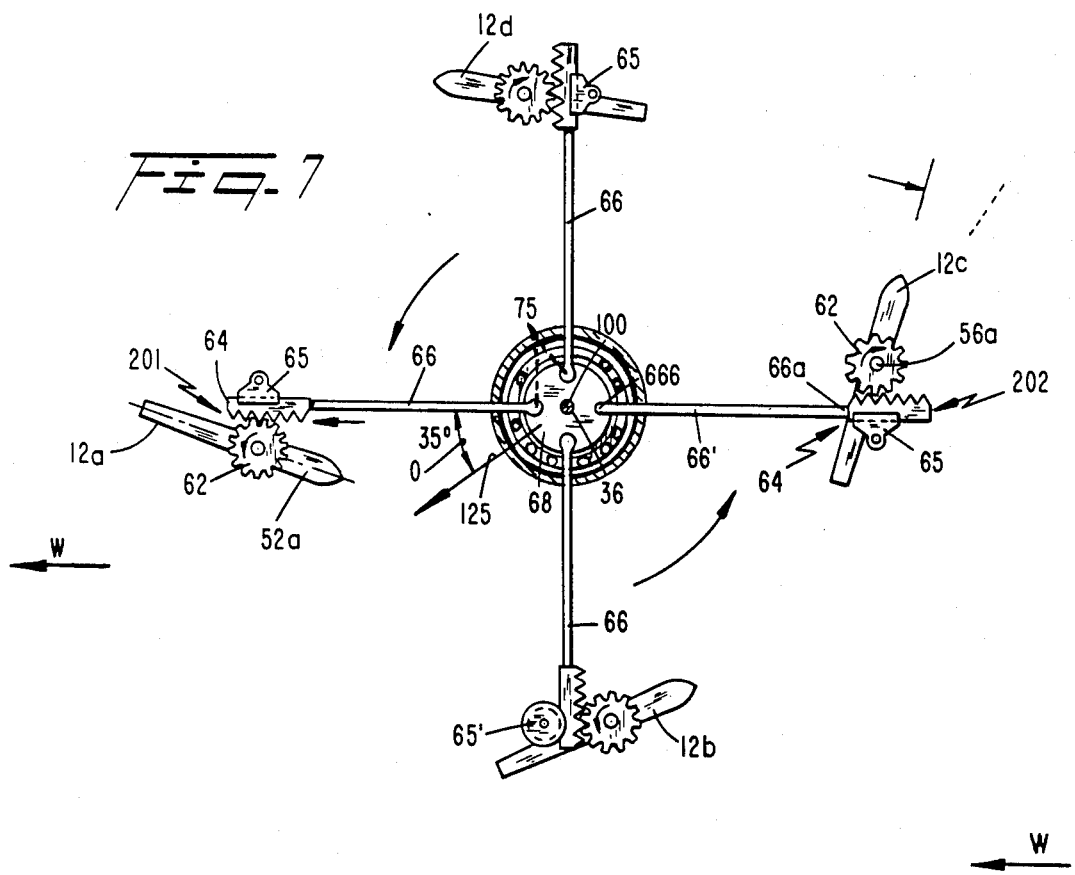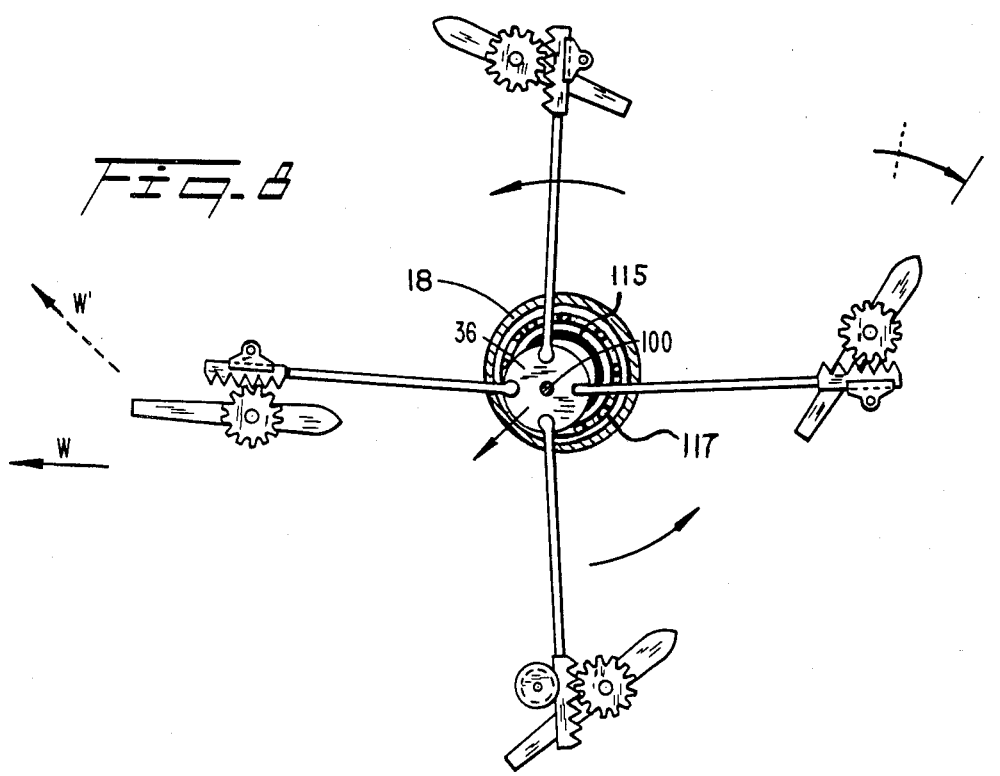

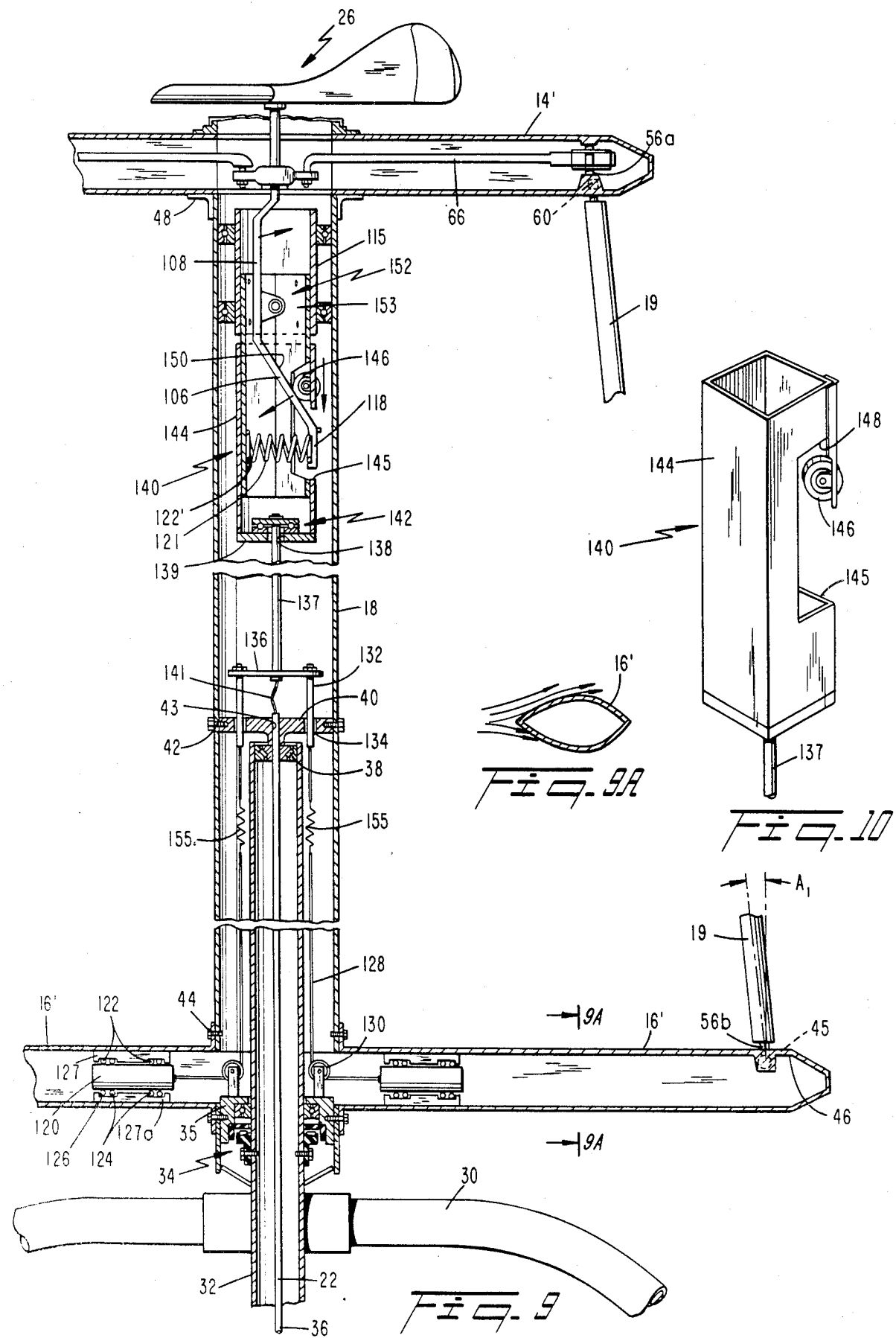

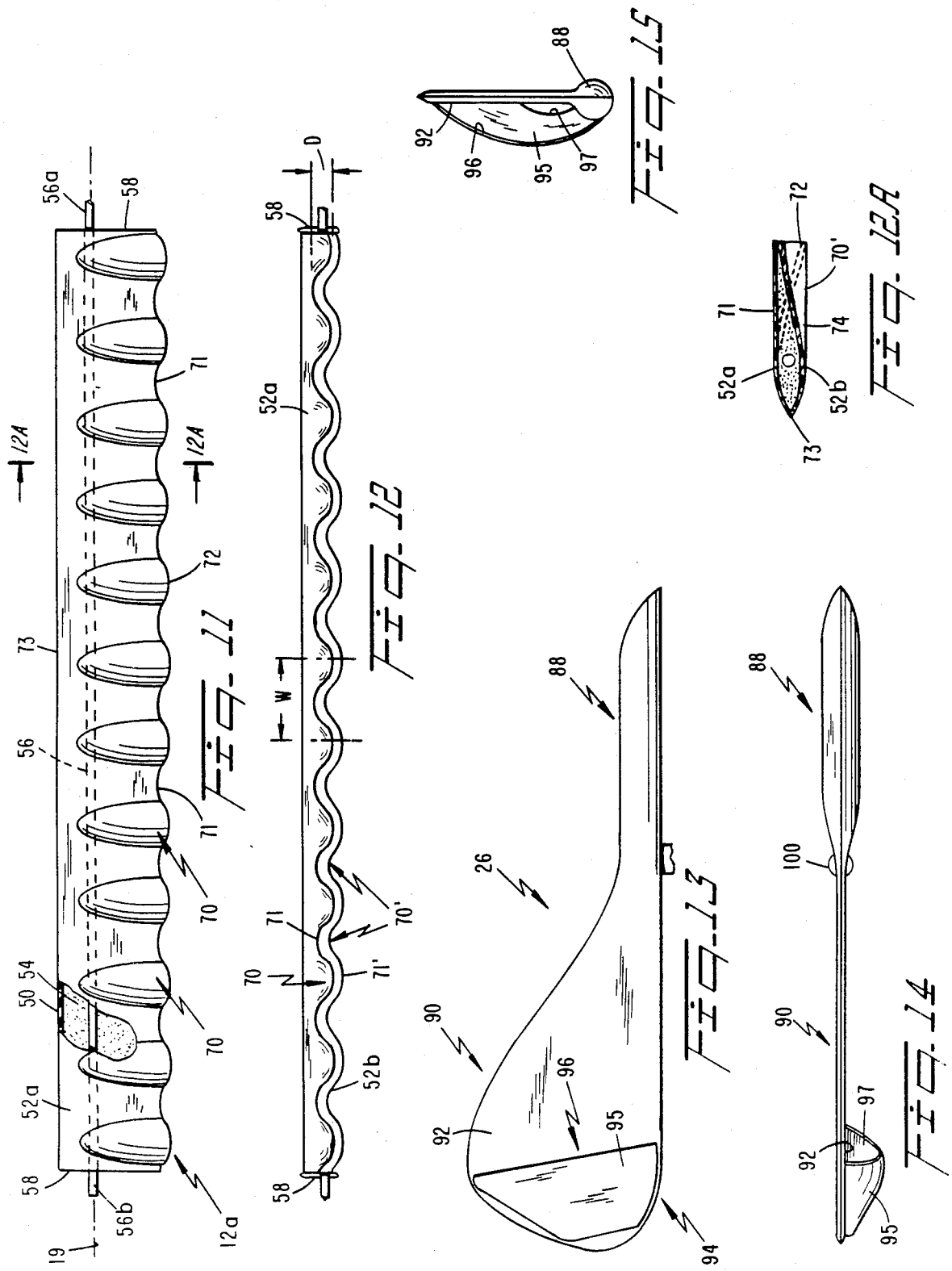

VERTICAL WIND TURBINE

TECHNICAL FIELD

The present invention generally relates to vertical, cross-wind axis wind turbines having plural wind driven blades with variably adjusted orientation to incident wind.

BACKGROUND ART

Wind axis and cross-wind axis turbines are the predominant wind turbines presently in use and under study. A wind axis turbine includes a number of blades mounted for rotation about a central horizontal column having an axis of rotation that must be closely aligned with the wind to produce power efficiently. Since wind direction tends to vary over time at most sites, high efficiency can be achieved only if the horizontal axis can be rotated to provide the close alignment. However, structure for rotating the horizontal axis into the wind tends to be expensive, resulting in poor power-cost ratios for very high power wind turbines.

Wind driven vertical turbines typically include an assembly of airfoils or blades mounted for wind-driven structure. Vertical wind driven turbines respond to wind from any direction without shift of the column or base structure thereof. However, to improve blade efficiency, by obtaining a more favorable blade angle of attack to the wind, it is often necessary to rotate each blade about an individual axis thereof as the assembly rotates about the vertical column. Known structures such as a type disclosed in U.S. Pat. No. 4,049,362 to Rineer, a ring gear arrangement as disclosed in U.S. Pat. No. 3,903,072 to Quinn, or a circular track and bearing arrangement as disclosed in German Pat. No. 742,788 to Hartwagner. The blade angle of attack control structures disclosed in the aforesaid patents also vary the blade angle of attack in response to changes in wind speed or velocity.

The foregoing blade control arrangements have a number of disadvantages, one being that a higher than average on site wind velocity is often necessary to overcome inertia of the ring gear, gear train or circular track mechanisms to initiate turning of the blades. Also, to maintain blade rotation, a certain amount of wind power is necessary to overcome inertia of the ring gear, gear train or circular track mechanisms to initiate turning of the blades. Also, to maintain blade rotation, a certain amount of wind power is necessary to overcome friction generated by these blade control mechanisms, adversely affecting power/cost ratios. Further, since gears employed in these prior art mechanisms rotate constantly, in wearing contact with each other, and operate under variable wind velocity conditions, frequent maintenance and/or replacement may be necessary, particularly after periods of excessive wind velocities. To generate sufficient wind power to achieve economical operation, vertical wind turbines generally include large airfoils. Devices to control such airfoils can be very costly.

Another problem associated with certain known relatively high efficiency cross-wind axis wind turbines is that the blades have complex shapes, thus being expensive to manufacture. Other turbines of this type are inefficient because the blades are not designed so they are always oriented to the wind for optimal wind energy absorption.

It is accordingly an object of the invention to provide a vertical wind turbine having a low inertia blade control mechanism for controlling both the speed and orientation of plural vertical blades under variable wind conditions to maximize conversion of wind power to usable power.

Another object of the invention is to provide a wind turbine having a blade control mechanism that is economical in design and capable of reliable operation in rugged and hostile environments, as occurs in on-site wind locations.

Yet another object is to provide for controlled orientation of blades in the vertical wind turbine of the invention to regulate angular velocity of the blades and hence conversion efficiency of the turbine.

Still a further object is to provide a wind turbine that is simple, reliable and inexpensive to construct.

DISCLOSURE OF THE INVENTION

A cross wind turbine in accordance with the invention includes an assembly of plural vertically extending turbine blades, mounted for rotation about a central common axis, and for rotation about individual longitudinal, vertically extending axes thereof so that the blade angle of attack relative to incident wind varies as the assembly rotates about the common axis in response to wind incident on the assembly. The angles of attack of the blades are controlled as a function of the speed and direction of the wind incident on the assembly. The angles of attack are controlled so that the tendency of the assembly to turn at different speeds as the incident wind changes speed is to a large extent compensated so the assembly turns at constant speed to supply constant power to an output shaft as long as the wind speed is above a minimum value and below a maximum value. The angles of attack are controlled by a wind speed direction detector, a separate pivot controller for each blade axis and a separate control to extend radially from the control axis. Each pivot controller is fixedly mounted in proximity to a point, at a fixed radius from the central axis and about which the particular blade axis pivots. Each control rod has a variable effective length controlled by the magnitude of the wind detected by the detector. The effective length of each control rod controls the pivot controller connected to control the angle of attack of the blade connected to the pivot controller.

According to a further aspect of the invention, a wind driven turbine of the vertical axis type, comprises an assembly of vertically extending blades including a generally vertical column, in combination with upper and lower sets of blade support spokes that extend radially from the column. The assembly is rotatably supported on a support base in elevated position above a generally horizontal wind barrier. The plural blades are connected between the upper and lower spokes to enable the assembly to be rotated about the column. Each blade can also rotate about a vertical axis thereof so it has a variable attack angle relative to incident wind by virtue of a unique control mechanism having plural connecting rods respectively extending horizontally and radially through the upper spokes in elevated position above the generally horizontal wind barrier.

In a preferred embodiment each blade is rotated about the vertical axis thereof and the column with the assistance of a rack and pinion connection between the blade and a rod. A control plate located in the vertical column interconnects each blade through the connecting rod associated with the blade by spherical bearings peripherally disposed in the plate. A control shaft pivotally mounted in the column includes a first shaft portion extending through a central bearing in the plate and a second shaft portion radially offset from the first shaft portion. The second shaft portion is pivotally connected to radially displace the first portion and thereby the connecting rods through the control plate to vary the blade angle of attack in response to changes in both wind speed and direction and rotational position of the blades about the column.

The offset second shaft control portion is preferably mounted on a pivot pin in a cylinder supported coaxially in the column on upper and lower bearings. As the blades rotate about the column, the force exerted by the wind striking each blade causes each pinion to turn in meshing engagement on each rack so that each blade angle of attack changes by an amount controlled by radial displacement of the low friction connection between the rods and control plate attained by the offset shaft portion pivoting smoothly within the cylinder.

Each blade is mounted on the upper and lower support spokes so as to be upwardly inclined towards the central vertical column axis by a predetermined angle to produce an accelerated downwardly swirling air flow between the turbine blades to improve efficiency. Preferably, the upper spokes are advanced approximately 3° in the direction of rotation with respect to the lower spokes, an angle that has been found desirable to enable the blade angle of attack along the length of each blade to gradually increase to compensate for variations in the tangential velocities of the upper and lower spokes. Furthermore, the lower spokes are preferably air foil shaped to cause wind to be drawn into the turbine interior through the spokes so that there is a greater total volume of wind exiting through the blades; this results in improved efficiency.

In a first embodiment a feedback arrangement for the blade angle of attack as a function of incident wind velocity, i.e., speed and direction, includes a wind vane fixed to an upper end of the first shaft portion above the upper spokes so as to be responsive to ambient wind velocity. As the wind changes direction, the vane rotates into realignment with the wind and adjusts the angular position of each blade by virtue of a connection between the vane and blade that provides synchronized rotation of the vane and offset control shaft, producing radial displacement of the rack and pinion connections. A change in the wind speed incident on the vane pivotally moves the offset control shaft about the pivot point thereof in a generally vertical plane to radially displace the rack and pinion connections and adjust the blade angle of attack.

In a second embodiment, a feedback arrangement responsive to the incident wind velocity includes a series of weights connected to the blades so that the radial position of the weights varies as a function of wind velocity, speed and direction, incident on the vane. The radial position of the weights affects the blade assembly moment of inertia and thereby the centrifugal force exerted by the wind on the blades. In the preferred embodiment, the weights are mounted on rollers in an interior region of two lower spokes. The weights move radially on the rollers with respect to the column through each spoke in response to variations in wind velocity sensed by the blades. Each weight is connected to pivot the offset control shaft portion by a cable and connecting rod arrangement disposed in the column and affixed to a hollow tubular member located in vertical coaxial alignment below the offset portion. An opening formed in a side wall of the tubular member receives a lower inclined portion of the offset control shaft. A roller rotatably mounted to an upper edge of the opening engages an inclined portion so that vertical movement of the tubular member in response to radial displacement of the weights causes the roller to travel along the inclined surface to pivot the offset portion so that blade adjustment occurs.

Preferably the wind vane has a low, relatively thick counter weight forward segment and a thin relatively high rearward segment provided with an air scoop. Such a wind vane, which differs from a standard "weathervane" by inclusion of the air scoop, enables wind speed and direction to be determined because the scoop functions in a manner similar to a wind sock to enable wind speed to be indicated by the offset shaft position about a horizontal axis; wind direction is indicated by rotation of the off-set shaft about the longitudinal axis thereof.

Still other objects and advantages of the present invention will become readily apparent to those skilled in this art from the following detailed description, wherein I have shown and described only the preferred embodiments of the invention, simply by way of illustration of the best modes contemplated by me for carrying out my invention. As is to be realized, the invention is capable of other and different embodiments, and its several details are capable of modifications in various obvious respects, all without departing from the invention. Accordingly, the drawing and description are to be regarded as illustrative in nature and not as restrictive.

BRIEF DESCRIPTION OF THE DRAWING

FIG. 1 is a perspective view of a wind turbine constructed in accordance with the invention;

FIG. 2 and 3 are schematic sectional views, taken along lines 2—2 and 3—3 of FIG. 1 of the blade angle of attack for the blade upper and lower portions;

FIG. 4 is a detailed, partial cross-sectional view of an offset control mechanism located in an upper portion of the turbine for adjusting the blade attack angles during blade rotation about a central vertical axis of turbine;

FIG. 5 is a sectional view taken along the line 5—5, FIG. 4 of a pivotal connection between an offset shaft portion of the control mechanism and the rotating support column to vary the blade attack angles;

FIGS. 6A and 6B are detailed views illustrating pivotal movement of the control mechanism to adjust the blade attack angle in response to an increase in wind speed;

FIG. 7 is a plan view of rack and pinion connections between each blade and the control mechanism for automatically adjusting the blade attack angles both during rotation about the support column and in response to changes in wind velocity;

FIG. 8 is a view similar to FIG. 7 of the blade attack angles being adjusted by the control mechanism in response to an increase in wind velocity;

FIG. 9 is a sectional view taken along the line 9—9 of FIG. 1 of an interconnection between a wind sensor control means actuated by weights to the blade control mechanism to vary the blade attack angles in response to changes in wind velocity;

FIG. 9A—9A is a sectional view taken along the line 9A—9A of FIG. 9, illustrating the cross sectional air foil shape of each lower spoke.

FIG. 10 is a perspective view of a control tube connecting the weights in FIG. 9 to the offset control mechanism;

FIG. 11 is a top plan view of a preferred form of wind turbine blade constructed according to the invention;

FIG. 12 is an end view of the blade shown in FIG. 11, illustrating the cross-sectional shape of wind channeling troughs formed along the entire blade length;

FIG. 12A is a sectional view taken along the line 12A—12A of FIG. 11 of the blade profile oriented towards the wind flowing through one of the troughs;

FIG. 13 is a side plan view of a wind vane according to an aspect of the invention;

FIG. 14 is a top plan view of the wind vane shown in FIG. 13; and

FIG. 15 is an end plan view of the vane shown in FIGS. 13 and 14.

BEST MODE FOR CARRYING OUT THE INVENTION

Referring to FIG. 1, crosswind axis turbine 10 is illustrated as including blade assembly having four, vertically disposed wind driven air foil blades 12a, 12b, 12c and 12d pivotally connected between upper and lower sets of horizontally extending support spokes 14 and 16, respectively, mounted so the blades can turn independently of each other about vertical axis 19 of each blade. Spoke sets 14, 16 are fixed to upper and lower ends of vertical column 18 rotatably mounted to support base 20 so that assembly 11 turns about column 18 in response to wind incident on the assembly. Output shaft 22 is coaxially mounted in and connected to be rotatably driven by column 18. Shaft 22 projects below column 18, where it is connected to a suitable driven mechanism 24 for converting the torque of shaft 22 to usable power. Uniquely designed blades 12a–12d, described infra, are mounted to spoke sets 14, 16 to rotate about two vertical axes, in particular the blades rotate coaxially with column 18 and about the individual longitudinal axes 19 thereof. Blades 12a–12d are constructed so that wind incident there on is channeled and compressed against each blade for maximum transfer of wind energy to turbine 10. A unique feedback control mechanism 25 responds to wind velocity (i.e. speed and direction) as detected by a wind vane 26 to differentially adjust the angle of attack of blades 12a–12d to maintain approximate constant rotational speed and output power of shaft 22 over a specified range of wind speeds i.e., between minimum and maximum speeds. (The blade angle of attack is the angle between the direction of the incident wind on a particular blade and chord 13, FIG. 2, of that blade. The blade chord is a vertically extending plant intersecting the longitudinal vertically extending blade axis about which each blade turns and a central apex at the intersection of the blade exterior surfaces).

Before describing the structure in detail, a general overview of the invention is provided by reference to FIGS. 1-3 and 7 and 8 wherein wind velocity vector W is assumed to be displaced from blade assembly coordinate axis 21' by angle $A_2$. Assembly 11 is rotated in the counter clockwise direction about axis 36 in response to velocity vector W. Vertical axes 19 of the upper portions of blades 12a and 12c are respectively displaced counter clockwise and clockwise about axis 21' by the angle $A_2$ while axis 19 of the upper portions of blades 12b and 12d are respectively displaced counter clockwise and clockwise below axis 21' by the angle $A_2+90°$.

Because spoke sets 14 and 16 are rotatable independently about axis 36 and the radial displacement from axis 36 of intersections 1-4 of axes 19 of blades 12a–12d and spoke set 14 is less than that of the intersections 5-8 of axes 19 of blades 12a–12d with spoke set 16, lower intersections 5-8 lag behind intersections 1-4 as assembly 11 rotates about axis 36 so the lower blade portion axes are displaced from axis 21' by angles of $A_3$ and $(A_3+90°)$, where $A_2$.

Each of blades 12a–12d includes a longitudinal horizontal axis 13 that intersects axis 19 and edge 73 (FIG. 11) at the intersection of opposite faces of the 70 and 70' of the blades. As assembly 11 is driven by wind vector W about axis 36 each of blades 12 continuously turns about the axis 19 thereof so that the angle of axis 13 of each blade continuously changes relative to wind vector W i.e., the angle of attack of each blade.

The angles of attack for blades 12 are also a function of the magnitude increases, there is a tendency for a greater force to be applied to blades tending to rotate assembly 11 at higher speeds about axis 36. This tendency to overcome to a large degree by changing the angles of attack for blades 12 as they turn about axis 36 so that the surface area of the blades relative to wind vector W decreases so there is a reduction in the force applied by the wind vector to blade assembly 11, to compensate for the initial tendency of the wind vector to drive assembly 11 at higher speeds.

In the situation illustrated in FIGS. 2 and 3 it is assumed that velocity vector W has a relatively small magnitude and an angle $A_2$ relative to assembly axis 21' in the plane of spoke set 14 so that the vector is directed coincident with the axis 21 from axis 36 to axis 19 of blade 12a, and is directed toward the surface of blade 12a away from axis 36. Under the assumed conditions, the angles of attack of blades 12a, 12b, 12c and 12d, i.e., the angles between axes 13 of blades 12a, 12b, 12c and 12d and vector W in FIG. 2, in the plane of spoke set 14 are respectively approximately 45°, 20°, 27°, and 2°. The angles of attack of blades 12a, 12b, 12c and 12d in the plane of spoke set 16 lag slightly behind those in the plane of spoke set 14 by the same approximate 3° angle. The radial positions of intersections 1-4 relative to axis 36 are substantially the same, inside of the radial positions of intersections 5-8. At these angles, maximum force is imparted by wind vector W to assembly 11 because of the large surface area upwind that blade 12a presents to the vector, as well as the substantial but smaller areas presented by advancing blade 12b and downwind blade 12c. Axis 13 of retreating blade 12d, however, is almost aligned with vector W, so blade 12d presents a very small area to vector W and does not introduce substantial drag.

Now assume that the magnitude of velocity vector W is substantially larger than previously described and that the angle of the vector is constant. Under these circumstances, the angles of attack of blades 12a and 12c respectively decrease and increase by relatively significant amounts while the angles of attack of blades 12b and 12d respectively decrease and increase by relatively insignificant amounts. The angles of attack of blades 12a–12d in the planes of spoke sets 14 and 16 change together because axes 19 are mounted at fixed radii in spoke sets 14 and 16. The angles of attack change in the plane of spoke set 14 because wind vane 26 causes substantial radial shift relative to axis 36 of control rods 66 connected to pivot controllers 201 and 202 for axes 19 of blades 12a and 12c. Because axes 19 are fixed relative to axis 36, the radial shift of rods 66 drives pivot controllers 201 and 202. The radius of control rods 66 connected to blade 12a and 12c are effectively decreased and increased respectively; to respectively decrease and increase the angle of attack of blades 12a and 12c. There is only a slight change in the effective radius of control rods 66 respectively connected to pivot controllers 203 and 204 for blades 12b and 12d under the assumed conditions because rods 66 are at right angles to incident wind vector W. Thereby, the angles of attack blades 12b and 12d do not change substantially. The change in the angle of attack of upwind blade 12a materially reduces the effective area presented by upwind blade 12a to vector W; the change in the angle of attack of downwind blade 12c increases the drag force exerted by blade 12c on assembly 11. The changes in the angles of blades 12b and 12d do not normally have a substantial effect on the force imparted by wind vector W on assembly 11. Thus, the tendency for the increased magnitude of wind vector W to turn assembly 11 at high speeds is compensated by the changes in drag angles of blades 12.

As assembly 11 is turned in response to wind vector W the angles of attack of blades 12 are constantly changing. Thus, as assembly 11 turns 90°, the angles of attack of blade 12a gradually changes from the position illustrated for it in FIGS. 2 and 3 to the position illustrated in FIGS. 2 and 3 for blade 12b. As the direction of wind velocity vector W changes, wind vane 26 controls the angles of blade axes 13 relative to assembly axis 21' so that the blade angles of attack remain constant relative to the direction of wind vector W for the same angular relationship of radius 21 and the wind vector direction. Thus, e.g., for low magnitude wind vectors, axis 13 of blade 12a is 45° displaced from radius 21 when radius 21 is aligned with wind vector W.

The mechanism for attaining these results and other improvements is now described in detail.

Support base 20, as best illustrated in FIG. 1, includes a pair of tubular support legs 30 each having a semicircular configuration in the vertical plane to elevate blades 12a-12d above the ground or other generally horizontal wind impervious surface to obtain maximum exposure of the blades to the wind, while presenting a narrow, rounded wind profile for improved stability. Support legs 30 are orthogonally arranged and fixedly mounted on cylindrical support tube 32 (FIG. 9, which projects vertically upward from the legs and is coaxially mounted in the lower end of hollow cylindrical column 18. Column 18 is rotatably supported on tube 32 by thrust bearing 34 and yoke 35. Output shaft 22 extends coaxially in support tube 32 along vertical axis 36 of column 18 and is rotatably supported by axial bearing 38, located in the upper end of the support tube. In response to blades 12 rotating, torque is transmitted from rotating column 18 to output shaft 22 through circular coupling plate 40, horizontally fixed in the column by bolts 42. The upper end of shaft 22 is fixedly connected to plate 40 in central opening 43 of the plate. As illustrated in FIGS. 1 and 9, lower spoke set 16 includes four mutually orthogonal, identical hollow spokes 16' extending horizontally and radially from column 18. Each spoke 16' is fixed to the lower end of column 18 by bolts 44.

Each of spokes 16' is shaped in cross section as an airfoil (FIG. 9A), preferably along the entire length thereof, to enhance air flow, by pushing air upwardly into the interior of blade assembly 11. The air moved into the interior of assembly 11 helps to create a increase in velocity in the assembly interior to enhance the flow of wind against the blades 12. Spherical bearing 45, mounted in distal end 46 of each spoke 16', receives the lower end of one of each of blades 12 enabling the blades to rotate about longitudinal axis 19 thereof to change the blades angle of attack to that wind force imparted to each blade is maximized.

Upper stroke set 14 also includes four identical hollow spokes 14' extending horizontally radially from column 18 and spaced 90° from each other. Each spoke 14' is fixed to the upper end of column 18 by L-shaped brackets 48. As illustrated in FIGS. 2 and 3, corresponding pairs of spokes 14', 16' are not vertically aligned; instead longitudinal axis 21 of each upper spoke is circumferentially advanced with respect to longitudinal axis 21a of each lower spoke so that each blade axis 19 is preferably tilted approximately 3° in the direction of rotation.

Each of blades 12a-12d is of identical construction and includes a molded structurely strong outer skin layer 50 (FIG. 11), defining opposite longitudinally extending surfaces 52a and 52b exposed to the wind. Mass 34 of low density filler, such as expansion foam, is disposed between surfaces 52a, 52b to impart structural rigidity to the blades. Rigidity is also enhanced by shaft 56 extending longitudinally through the blade to define blade axis 19.

Upper and lower ends 56a and 56b of shaft 56 project outwardly through spoiler end panels 58 respectively located at opposite ends of each blade. Lower shaft end 56b is received in spherical bearing 45 (FIG. 9) provided in each lower spoke 16' as mentioned above. Upper shaft end 56a extends through axial bearing 60 mounted in the bottom and adjacent the outer end of each spoke 14'. Pinion 62 fixed to upper shaft end 56a is thereby located in each spoke 14' to mesh with a rack 64 attached to free end 66a of connecting rod 66 that extends longitudinally through spoke 14'. The opposite end 66b of rod 66 is connected to circular connecting plate 68 (FIGS. 4 and 7) to control adjustment of the angle of attack of each blade as assembly 11 rotates about column 18 as described infra.

Each blade 12a-12b has a teardrop cross section defined by a series of troughs 70 and 70' (FIGS. 11, 12, and 12A) respectively formed equispaced and parallel to each other between crests 71' along the entire blade length on both surfaces 52a and 52b. Mating troughs 70, 70' on opposite surfaces 52a and 52b are longitudinally aligned with each other to intersect trailing edge 72 as a common longitudinal location and are tapered to have decreasing width and depth as they extend from edge 72 to edge 73 in the direction of 73. The taper extends across approximately 80% of the uniform blade width between edges 72 and 73. The bottom of each trough 70 and 70' are staggered with respect to each other along the blade length so that each trough defines and airfoil shaped blade segment in cross section. In this manner, troughs 70 reduce the speed of wind striking high pressure blade surfaces 52a or 52b, whichever surface is exposed directly to the wind as occurs particularly when the blades are in the upwind position of blade 12a (surface 52a) or downwind position of blade 12c (surface 52b). The wind incident on the surface 52a or 52b diverges across the entire surface and decelerates as it flows smoothly across the concave surface of each trough towards trailing edge 72, to transfer a greater amount of wind energy to the blades. Simultaneously, in the upwind position of blade 12a, crests 71' located on the low pressure side or surface 52b opposite troughs 70 create a high pressure section opposite the high pressure section created by troughs 70 so that the trailing vortex drag of the merging high and low pressure sides is substantially reduces, as also arms on the low pressure surface 52a when the blades are in the downwind position of blade 12c.

When the blades travel into the direct upwind position of blade 12d in FIG. 2, trough 70' on high pressure surface 52b primarily coact with troughs 70 on low pressure surface 52a to reduce vortex drag since the blades in this position are generally aligned with the wind. When the blades are in the position of blade 12b in FIG. 2, the troughs 70 on high pressure surface 52a narrow in the downward direction, causing wind to compress and accelerate against the downwind leading edge 73 of the blade to rotate the blade in the direction of rotation.

To minimize the total surface area of troughs 70 and crests 71 (defined by troughs 70') directly channeling wind flow across the width of each blade 12a-12d and thereby minimize skin friction, the preferred range of the ratio of width W to depth D of each trough is approximately 4:1 to 8:1. For optimal results, however, a preferred ratio W:D is abut 6:1.

As best illustrated in FIG. 1 for blades 12a and 12c, blades 12a-12d are mounted on spokes 14' and 16' so the upper portion of each blade is closer to column 18 than the lower portion of the blade wherein blade assembly 11 is similar to a truncated cone having a lower base layer than an upper base. Because of this truncated cone arrangement, the pair of downwind blades draws air into the interior of blade assembly 11 through the upper section of the assembly. The air drawn into the upper part of assembly 18 spirals downwardly about column 18 to combine with air flowing upwardly into the assembly through air foil shaped spokes 16'. The upwardly and downwardly directed air currents meet in the interior of assembly 11 where they combine to exit from approximately the lower two thirds of the assembly (i.e., in the space between spokes 16' and two thirds of the way up to spokes 14'). The exiting air current flows in the same general direction as the incident wind. With this arrangement, a large volute volume of air is swirled and accelerated in less than the total interior volume (i.e.., the lower two thirds portion) of assembly 11, thereby imparting additional wind energy to blades 12a-12d. The accelerated, swirling air flow obtained with inclined blades 12a-12d also promotes laminar flow conditions in the interior of assembly 11 without creating a standing wave effect (i.e. wind repeatedly reflecting off the blades in the assembly interior, without escaping from the interior; the standing wave tends to cause turbulence and impair blade efficiency).

To obtain the accelerated swirling air flow in assembly 11 as described above, the ratio of the diameter of upper spoke set 14 to the diameter of lower spoke set 16 is preferably about 2:3 although the ratio can vary from between approximately 1:2 to 4:5; the height of column 18 is preferably equal to the sum of the diameters of upper and lower spoke sets 14, 16 but can be as small as the diameter of the lower spoke set. With the aforesaid preferred ratios, blades 12a-12d are positioned on spokes 14', 16' so axis 19 of each blade is inclined from the vertical towards central axis 36 by about 6° (inclination angle $A_1$, FIG. 9); while being advanced about 3° (blade advance angle $A_2$) in the direction of rotation, as discussed above. However, when the ratio of diameters of the upper and lower spokes 14' and 16° as well as the height of column 18, is varied within the above ranges, I have found that the following equations can be used to calculate inclination angles $A_1$ and blade advance angle $A_2$, in degrees, to within a 1° accuracy:

$$A_1 = 90° - \arctan \frac{B - T}{2H}$$

$$A_2 \cong \tan\left(\frac{1}{A_1}\right)$$

where:
H = height of column 18
B = diameter of lower spoke set 16
T = diameter of upper spoke set 14

Since blade axis 19 is tilted preferably about 3° in the direction of blade rotation and preferably 6° towards axis 36 as mentioned above, it can be seen from FIGS. 2 and 3 that the angle of attack of each blade 12a-12d to the wind increases as the height of each blade increases toward upper spoke set 14 (i.e., B > B' in FIGS. 2 and 3). This variation in blade attack angle is necessary due to the lower tangential velocity of smaller upper spokes 14' relative to the lower spokes 16' during rotation of assembly 11 about column 18. In this manner, each section along the entire length of blades 12a-12d is respectively maintained at a favorable angle or attack between B and B' to optimize blade efficiency. Furthermore, to produce maximum torque with turbine 10, I have found that the following formula can be used to calculate the width (W) of each blade 12a-12d:

$$W = 0.0533 \pi B$$

Oscillation of each blade 12a-12d about blade axis 19 thereof is controlled by a rack and pinion assembly comprised of rack 64 pivotally supported in the upper spokes on pillow blocks 65 or slider wheel 65' at outer end 66a of each connecting rod 66; racks 64 respectively mesh with pinions 62 provided at upper end 56a of each blade. As illustrated in FIGS. 4 and 7, three of connecting rods 66 are pivotally mounted to circular connecting plate 68, located in the upper portion of column 18, by spherical bearings 75 peripherally disposed on the plate 90° from each other. The inner end of the remaining connecting rod 66', secured to blade 12a, is fixedly attached to the periphery of plate 68 at a location 90° from adjacent bearing 75. Thereby rods 66 are free to pivot about fixed points adjacent the periphery plate 68 while rod 66' always remains fixed in position so the longitudinal axis thereof intersects axis 36.

Spherical bearing 77, mounted in the center of plate 68, receives an upper vertical section 100 of a control shaft 80 that projects through upper end 82 of column 18, covered by a flexible weather seal 84. Wind vane 26, fixed to the upper end of shaft 80 above upper spoke set 14, adjusts the pitch of blades 12a-12d through the assemblies including racks 64 and pinions 62 in response to changes in wind velocity, as described below. Stop 86, fixed to shaft section 100 supports bearing 77 and thereby plate 68 in a horizontal plane immediately below connecting rods 66.

Wind vane 26, as best illustrated in FIGS. 13-15, is a horizontally extending structure having a low, relatively thick counterweight profiled forward segment 88 and a thin relatively high rearward segment 90. Segments 88, 90 located on opposite sides of upper section 100 of control shaft 80 (FIG. 4), have the same weight for improved stability. Fixed to vertical face 92 of rear segment 90 is air scoop 94 having curved wall 95 defining large upwind opening 96 and a smaller downwind opening 97. As wind passes around profiled forward segment 88 and enters upwind opening 96, wall 95 tapered towards rear opening 97, causes the passing wind to strike vertical face 92, to turn vane 26 into alignment with the wind and rotate control assembly 80.

Control assembly 80, forming wind speed and direction detector of feedback control mechanism 25, constitutes an important feature of the invention. As illustrated in FIG. 4, assembly 80 includes shaft 81 that is located primarily in column 18 and has straight vertically extending upper and intermediate segments 100 and 018 connected to each other by inclined segment 104. Upper section 100 extends upwardly through center bearing 77 so it supports vane 26 above blade assembly 11. Rod 81 includes portion 106, projecting downwardly from and inclined relative to segment 108. Shaft portions 100, 104, 106, and 108 are coplanar, with vertical portion 108 radially offset (i.e., non-coaxial) with respect to section 100. Sleeve 110, fixed to offset shaft portion 108, includes an elongated horizontal passage 112 containing horizontal pin 114, having one end attached to an inner surface of sleeve bearing 115. Bearing 115 is coaxial with axis 36 and is rotatably mounted in the upper portion of column 18 by pairs of upper and lower axially spaced bearings 117 located between the facing outer walls of bearing sleeve 115 and inner surfaces of column 18. Vertically extending seats 119 and 122, respectively at the lower ends of inclined shaft portion 106 and sleeve 115 capture opposite ends of compression spring 120, having a horizontal axis to provide an counter force for the tendency of shaft 81 to rock about pin 114 in response to vane 26 tilting as a function of the speed of wind incident on the vane. When the wind calms, spring 120 stabilizes vane 26 in the horizontal plane. The pivot angle of rod 81 relative to pin 114 controls radial displacement on control plate 68 relative to axis 36 of column 18, to control the angular position of each blade 12a-12d about the axis thereof at the different angles about axis 36.

To understand the operation assume that each blade 12a-12d is mounted to assume a particular angle of attack relative to the incident wind (see FIG. 7) which is aligned with the axis of spoke 16 carrying blade 12a. Thereby blades 12a and 12c are respectively in upwind and downwind positions, while blades 12b and 12d are in cross wind positions. Blade 12a is rotated by connecting rod 6, rack 64 and pinion 62 connected to it so it has a favorable wind angle of attack, depending upon wind speed, of approximately 45°, the approximate angle where maximum wind energy is imparted to rotate the blades. As blade 12a rotates 90° about column axis 36 into the downwind position occupied by blade 12b in FIG. 7, the effective wind striking exposed blade surface 52a causes pinion 62 to rotate in meshing engagement with the teeth of rack 64 (pivotally supported within each spoke 14' by a pillow block 65 or grooved control wheel 65') so that blade 12a rotates about axis 19 in a controlled manner to assume a lesser angle of attack of about 20° allowing the blade to continue imparting rotative torque to the turbine structure without causing excessive wind resistance. As blade 12a continues traveling downwind into the position occupied by blade 12c in FIG. 7, pinion 62 continues to rotate while moving rack 64 so that the blade assumes an angle of attack of about 27° allowing wind to smoothly exit from the interior of turbine 10. As blade 12a then rotates in the upwind direction into the position of blade 12d in FIG. 7, the angle of attack becomes about 2° so that the blade is virtually traveling parallel to the wind to minimize resistance. Simultaneously, of course, connecting rods 66 which are interconnected through plate 68 move radially to adjust the blade angle positions of the other blades 12b-12c during travel thereof into the aforesaid positions.

Offset shaft portions 104, 106 and 108 of control shaft 81, being pivotal in vertical plane 125 about pin 114, advantageously allow radial placement of upper shaft portion 100 and thereby control plate 68 so that the effective length of each connecting rod 66 constantly changes during blade rotation about central axis 36 due to the aforesaid movement of racks 64 caused by pinions 62. By experimentation, it has been found that offset portions 104, 106 and 108 are mounted so as to be offset from the forward or upwind segment 88 of vane 26 in the direction of rotation by an angle 0 of between 30° and 40°, preferably 35°. It has been discovered that this mounting relationship uniquely operates to create a favorable attack angle of blades 12a-12d for a longer duration during the downwind phase of blade travel, enabling turbine 10 to derive more power from this phase of rotation about axis 36. This arrangement also permits blades 12a-12d to rotate about column 18 at a tangential linear velocity of between 2.3 and 2.6 times greater than wind speed to obtain maximum power output.

Bearings 75, 77 maintain connecting plate 68 in substantially the same horizontal plane as the longitudinal axis of connecting rods 66 continuously change in the aforesaid manner as the blade attack angles change in the aforesaid manner during rotation about axis 36. Furthermore, bearings 75, 77 as well as the aforesaid rack and pinion connections and easy pivoting movement obtained with the offset control shaft 80 within cylindrical bearing 115 provide low friction, smooth translational movement of connecting rods 66.

Wind vane 26 uniquely operates as a static wind load control through the aforesaid rack and pinion connections 201-204 and control shaft 80 to provide further blade adjustment in response to changes in wind speed or direction. For example, should wind direction change from W to W' in FIG. 8, rotation of vane 26 into realignment with the wind causes corresponding rotation of shaft section 100 and thereby pivotal movement of offset portion 108 so that plate 68 moves radially to reorient the blade angles. Vane 26 rocks backward about pin 114 in response to an increased wind flow entering air scoop 94, (see FIGS. 6A and 6B), causing plate 68 to translate in the downwind direction by the action of shaft section 100 acting against the plate. Connecting rods 66 between plate 68 and blades 12a-12d are translated causing the effective radii of intersections 1-4 and the attack angles of blades 12a-12d to change, as described supra, so that the blades do not overspeed. Thus constant speed and power output of blades 12a-12d are maintained while excessive stress and possible damage to turbine 10 is avoided.

Should excessive wind conditions develop (e.g., hurricane wind force), racks 64 and pinions 62 respond t control shaft 80 to adjust the blade attack angles to turn blades 12a-12d so axes 13 are aligned with wind velocity vector W to stop turbine 10. The aforesaid arrangement also adjusts the blade angles of attack when assembly 11 has been braked, to dump high wind loads from blades 12a–12d, thereby avoiding damage to the blade structures.

A second embodiment of control mechanism 25 for controlling the blade angles of attack in response to changes in wind speed and direction includes a pair of cylindrical weights 120 respectively located inside of two diametrically opposed lower spokes 16'. As illustrated in FIG. 9, each cylindrical weight 120 is slidably mounted between pairs of upper and lower roller bearings 122 and 124, respectively carried in semicylindrical channels 126 of bearing support members 127 and 127a. Roller bearings 122, 124 engage circumferential surfaces of weights 120 to define a horizontal slide path to enable the weights to move radially with respect to column 18 through spokes 16' in response to variations in centrific force caused by changes in wind velocity acting on blades 12a–12d.

Two cables 128, respectively attached to the faces of weights 120 adjacent column 18, pass around pulleys 130, mounted on yoke 35 and extend vertically upward between column 18 and support shaft 32, for attachment to a pair of vertically extending connecting rods 132. Rods 132 are slidably disposed in apertures 134 of coupling plate 40; upper ends of the rods are connected to horizontal cross plate 136, located above the coupling plate. Connecting rod 137, fixed to the center of plate 136, extends upwardly along central axis 36. The upper end of rod 137 passes through opening 138 in plate 139 at the bottom of hollow, square control tube 140 and is connected to throwout bearing 142, mounted on plate 139. Bearing 142 prevents rotation of control tube 140 with rod 137 and weights 120 about the column 36 axis during blade rotation about column 18. Flexible oil tube 141 extends through shaft 22 to supply lubricant from a source (not shown) to bearing 142.

Tube 140 is mounted directly below and coaxially with cylindrical bearing 115 (surrounding offset shaft portion 108) to receive the lower inclined shaft portion 106 between side walls 144. Tube 140 includes side walls 144 one of which has an opening 145 through which the lower end 118 of shaft portion 106 projects. Roller 146, rotatably mounted to upper edge 148 of opening 145, rolls on straight upper inclined surface 150 of shaft, portion 106 to vary the position of offset portion 108 in the manner described below. Upper end 153 of L-shaped guide member 152 is fixed to the inner surface of cylinder 115 to extend downwardly to be received between and slide along side walls 144 to maintain square tube 140 in vertical, coaxial alignment with the cylinder. Pin 114 is fixed to the upper portion of guide member 152. Compression spring 120 is horizontally disposed in tube 140 between lower end 118 of inclined portion 106 and seat 122', abutting against the lower edge on the inner surface of the guide member.

With the arrangement of FIG. 9, weights 120 slide radially in spokes 16, so the weights move away from column 18 when the wind speed acting on blades 12a—12d increases. The outward movement of weights 120 draws cables 128 down to exert a downward force on connecting rod 137 through rod 132 and cross plate 136 to pull square tube 140 (which does not rotate with connecting rod 139 by virtue of throwout bearing 132). As tube 140 moves down, roller 146 exerts a force on inclined surface 150 so that offset shaft portion 108 pivots on pin 114 to increase the attack angles of blades 12a–12d in the manner described above. Spring 155, connecting plate 136 to coupling plate 40, is thereby loaded in compression so that weights 120 are retracted by the force of spring 155 when wind speed decreases, allowing square tube 140 and roller 146 to move up along surface 150 to restore the blade angles.

Weights 120 in the second embodiment are preferred for use instead of wind vane 26 in large installations. However, weights 120 can be used in combination with vane 26 to vary the blade attack angles in the aforesaid manner. When using weights 120, it will be recognized that they tend to move radially back and forth about an equilibrium point within spokes 16' as the weights adjust the blade angles of attack in response to changes in wind speed and direction, since, after initial adjustment occurs in the aforesaid manner, the weights tend to move radially inward (if wind speed has increased or wind direction has changed counterclockwise in FIG. 2) in response to a lowering of centrifugal force acting on the blades (restored to constant velocity movement).

The foregoing description of a preferred embodiment of the invention has been presented for purposes of illustration and description. It is not intended to be exhaustive or to limit the invention to the precise form disclosed, and obviously many modifications and variations are possible in light of the above teaching. This embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A wind driven turbine of the vertical axis type comprising:
   (a) a support base;
   (b) a generally vertical column rotatably mounted to the support base;
   (c) upper and lower support means respectively mounted on said column for rotation therewith;
   (d) a plurality of wind driven blades connected between the upper and lower support means for rotation about said column and each blade being individually rotatable about a blade axis extending longitudinally through the blade to vary a blade angle of attack thereof relative to wind velocity during rotation about the column; and
   (e) control means for variably adjusting angles of attack of each blade to incident wind, said control means including a connecting rod means having drive means for rotating each blade about the associated blade axis in response to radial movement of the connecting rod means and control shaft pivotally mounted within said column and having a first shaft portion connected to the connecting rod means and a second shaft portion radially offset from the first shaft portion and pivotally connected to radially displace the first portion and thereby the connecting rod means to vary the blade angles of attack during rotation about said column, wherein said upper support means includes four substantially identical spokes extending substantially horizontally radially from said column said connecting rod means including a connecting rod extending through each upper spoke for connection of said drive means to a driven means mounted on a portion of a shaft passing through each blade, wherein said control means further includes a plate to which three of said connecting rods are pivotally affixed by sperical bearing means respectively spaced 90° from each other and a center spherical bearing mounted in said plate to receive the first shaft portion therein the fourth connecting rod being nonrotatably affixed to the plate periphery enabling radial displacement of said plate and connecting rods in a generally horizontal plane, wherein said control means further includes a cylindrical bearing member rotatably mounted within said column on races with said offset second shaft portion being pivotally mounted within said cylindrical bearing by means of a pivot pin affixed to an inner surface of the bearing mounted cylinder.

2. The turbine of claim 1, further including a compression spring extending thereunder said pivot pin on second shaft portion to contact the inner cylinder to bias the offset portion.

3. The turbine of claim 2, wherein said linearity driven blade means includes a rack affixed to outer end of each connecting rod, said driven means including a pinion meshing with teeth provided on each rack to cause radial displacement of the connecting rods through the alignment plate.

4. The turbine of claim 3, further including a wind vane structure affixed to the first shaft portion above the upper spokes, said vane causing rotational movement of the control shaft in response to variations in wind direction, with wind velocity thereby causing pivotal arc movement of said second shaft portion and radial displacement of each connecting rod through said control plate to radially displace each rack to change the blade attack angles.

5. The turbine of claim 4, wherein said wind vane includes a low relatively thick counter weight in forward segment and a thin relatively high rearward segment extending horizontally from the first shaft portion, and an air scoop located on a located on a vertical face of said rear segment, said air scoop having a curved wall defining a large upwind opening and a smaller downwind opening enabling wind to enter the scoop to strike the vertical face and thereby rotate the vane into the wind controlling the feedback response.

6. The turbine of claim 5, wherein said lower support means includes four identical spokes, extending horizontally and radially from attachment to the column and spaced 90° from each other.

7. The turbine of claim 6, further including a pair of weights respectively mounted within an interior area of two diametrically opposed lower spokes on roller bearing means enabling the weights to move radially with respect to the column through said spokes in response to variations in centrifugal force caused by changes in wind velocity acting upon said blades, and means interconnecting each weight to pivot the offset second shaft portion to adjust the blade angles in response to movement of said weights.

8. The turbine of claim 7, wherein said interconnecting means includes cable means attached to each weight and extending upwardly through the column for the connection to a hollow tubular member located in vertical, coaxial alignment with said cylinder to receive a lower inclined portion of said second shaft portion through an opening formed in a side wall of said tubular member, said opening carrying a roller rotatably mounted to an upper edge of the opening to engage an inclined surface of the inclined rod portion, said tubular member being vertically movable in response to radial displacement of said weights causing the roller to travel a long the inclined surface to thereby pivot the offset portion causing blade adjustment.

9. The turbine of claim 8 further including an output shaft interconnected to and coaxially bearing mounted within said column support for rotational movement there with said output shaft projecting downwardly from within the supporting column tube to deliver rotative torque to a means converting torque to usable power.

10. The turbine of claim 6 wherein a ratio of the length of the upper spoke to the length of the lower spoke is approximately 2:3 and the height of said column is equal approximately to the sum of the diameters of said upper and lower spoke sets causing each blade to be upwardly inclined towards the central vertical axis of said column by a blade inclination angle of approximately 6° as measured between a vertical plane extending tangentially through an outer end of the lower spoke and said blade axis, said blades thereby causing air entering the interior of the turbine from an upper section thereof to rotate downward about said column to produce a swirling accelerated air flow imparting additional wind energy to the blades.

11. The turbine of claim 10, wherein each lower spoke is airfoil shaped causing wind to flow upwardly into the turbine interior through said spokes to flow with the accelerated swirling air flow obtained with said inclined blades for improved efficiency.

12. The turbine of claim 11, wherein said upper spokes are mounted to said column so as to be circumferentially advanced with respect to the lower spokes by approximately 3° incline angle divided by two to thereby obtain a higher angle of attack at upper blade portions relative to the angle of attack of the lower blade portions.

13. The turbine of claim 6, wherein a ratio of the diameter of the upper spoke set relative to the lower spoke set is approximately 1:2 to 4:5.

14. The turbine of claim 13, wherein the height of said column is at least approximately equal to the diameter of the lower spoke set up to and including the sum of the diameters of the upper and lower spoke sets.

* * * * *